July 25, 1967  H. D. GRIDLEY  3,332,716
CARGO HANDLING APPARATUS
Filed July 18, 1966  3 Sheets-Sheet 1
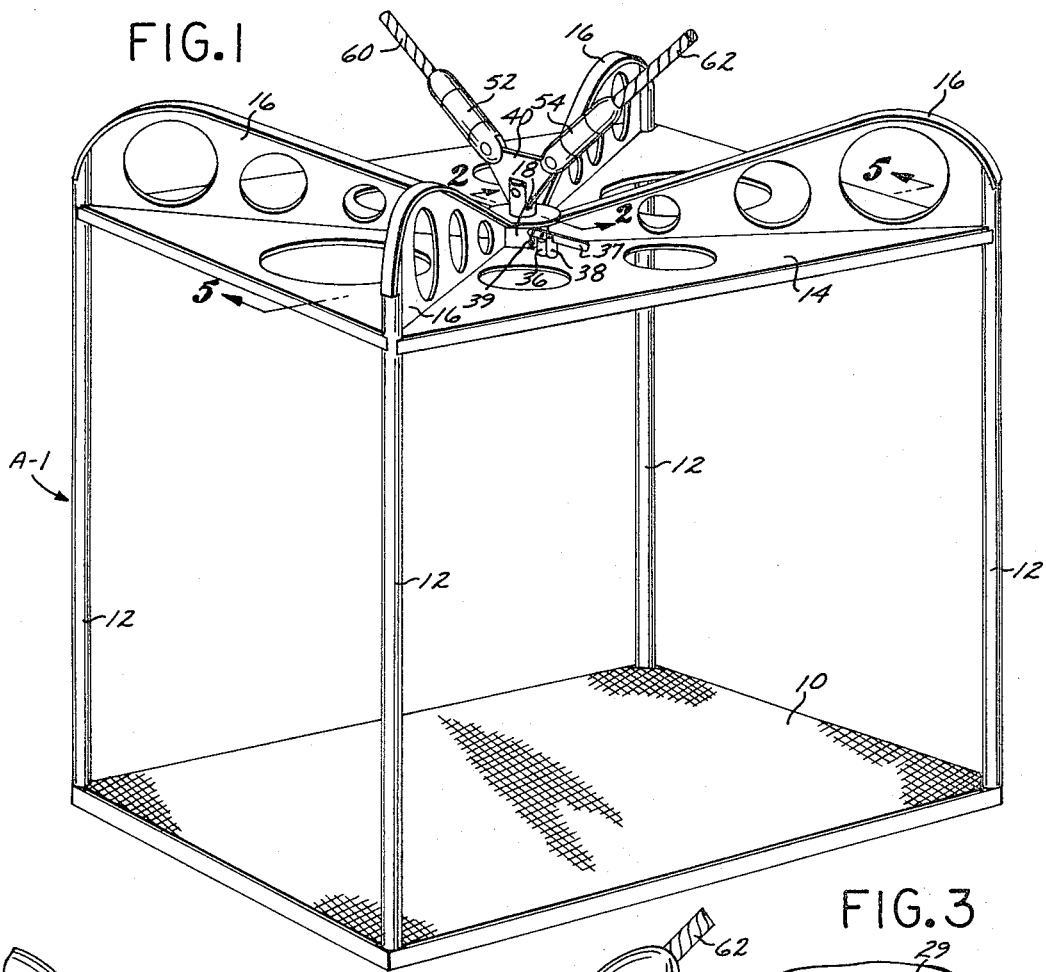
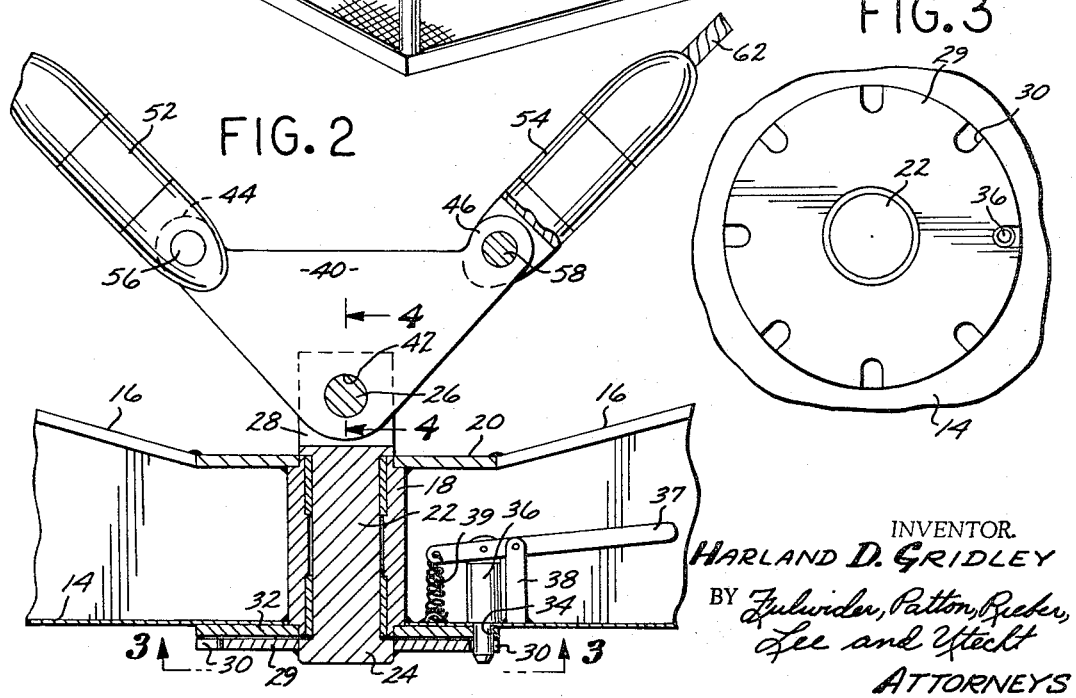
INVENTOR.
HARLAND D. GRIDLEY
BY Fulwider, Patton, Rieber,
Lee and Utecht
ATTORNEYS

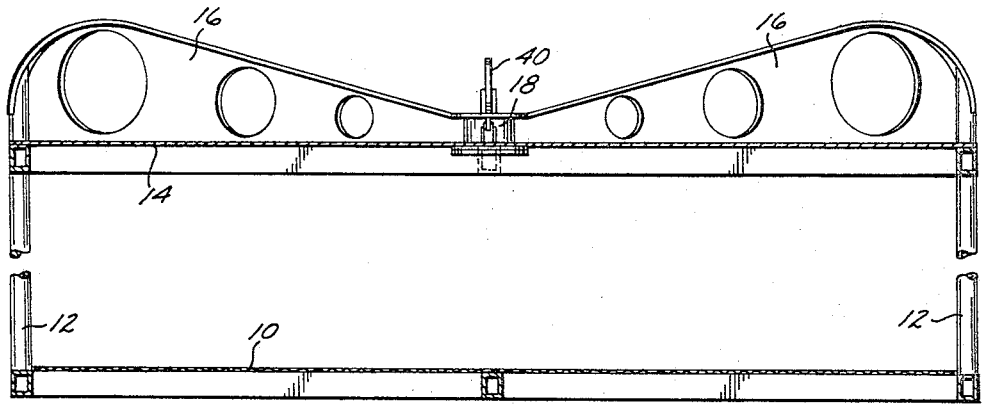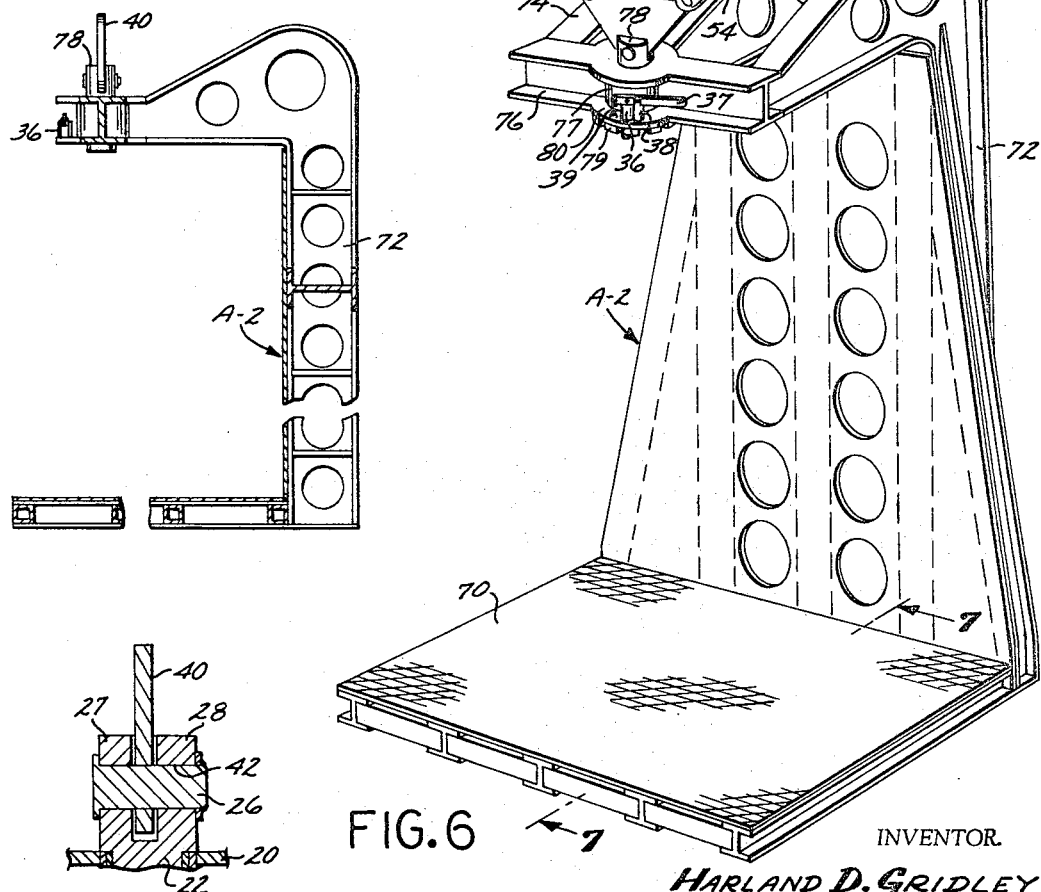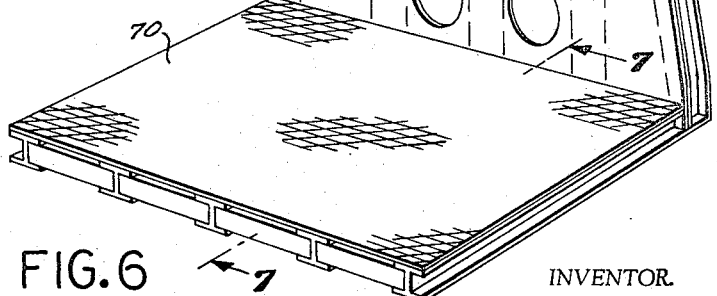

July 25, 1967 H. D. GRIDLEY 3,332,716
CARGO HANDLING APPARATUS
Filed July 18, 1966 3 Sheets-Sheet 3
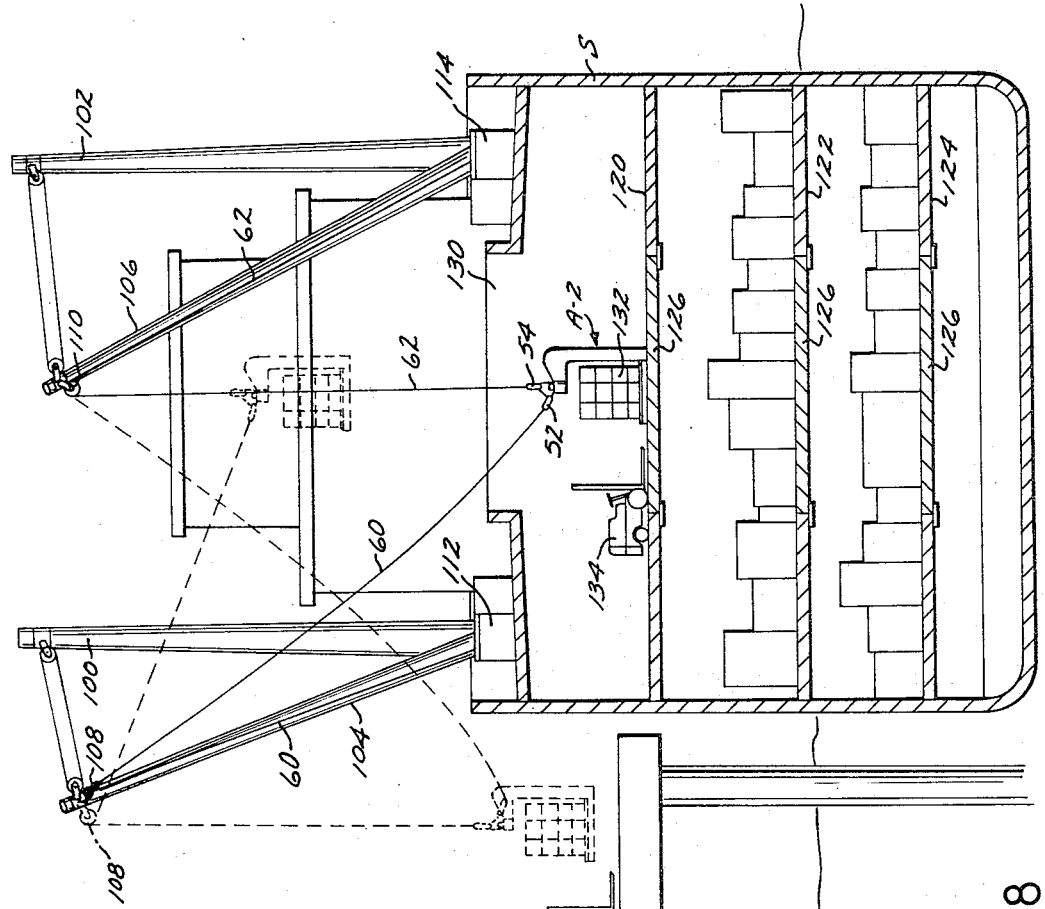
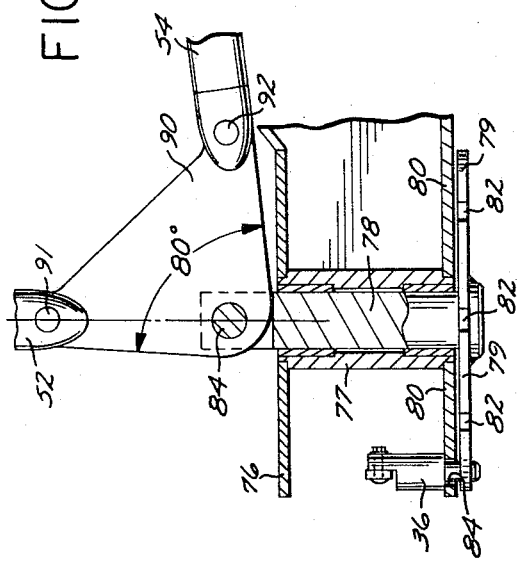
INVENTOR.
HARLAND D. GRIDLEY
BY Fulwider, Patton, Rieber,
Lee and Utecht
ATTORNEYS United States Patent Office 3,332,716
Patented July 25, 1967

3,332,716
CARGO HANDLING APPARATUS
Harland D. Gridley, 312 Euclid,
Long Beach, Calif. 90814
Filed July 18, 1966, Ser. No. 565,911
10 Claims. (Cl. 294—67)

The present invention relates generally to the art of cargo handling, and more particularly to a new and novel apparatus for loading and unloading cargon from a ship by the normal shipboard hoisting lines forming part of the ship's gear.

It is conventional practice to load and unload ships by means of a horizontal pallet that is lifted by a sling, such sling being connected to the hoisting or load lines that are raised and lowered by the permanent shipboard derrick. In loading a ship, a loaded pallet is lowered onto a deck of the ship and then disconnected from the sling. Thereafter, the pallet is moved by means of a fork lift to the point where the cargo is removed from the pallet. In unloading a ship, the reverse procedure is followed. The hoisting lines are steel cables and because of the inherent twist assumed by these cables, the pallet will not touch down in a predetermined position and must, therefore, be aligned with the fork lift by workmen standing on the deck and the dock, as the ship is being loaded or unloaded.

It is a major object of the present invention to provide apparatus for loading and unloading a ship that eliminates the need of manually aligning a pallet with a pallet-receiving fork lift.

Another object of the present invention is to provide cargo handling apparatus that includes a pallet which is automatically aligned in a desired direction when it touches down on a ship's deck or on a dock.

A further object of the present invention is to provide cargo handling apparatus of the aforedescribed nature that is simple of design and rugged of construction whereby it may afford a long and trouble-free service life.

An additional object of the present invention is to provide cargo handling apparatus of the aforedescribed nature that is economical of construction.

Yet another object of the present invetntion is to provide cargo handling apparatus of the aforedescribed nature that is completely foolproof in operation.

A more particular object of the present invention is to provide cargo handling apparatus for use with first and second hoisting lines that include a pallet having bale means, with a lifting post being carried by the bale means for rotation about a vertical axis relative to the bale means, and with an indexing disc having circumferentially-spaced openings being keyed to the lifting post. A complementary indexing disc is arranged on the bale means, such complementary indexing disc being formed with circumferentially-spaced openings alignable with the openings of the indexing disc of the lifting post. An indexing pin is selectively engageable with the openings of the indexing discs to adjust the angular position of the lifting post relative to the bale and pallet. A yoke is connected to the indexing pin and first and second swivel members are affixed to the yoke, with the latter being respectively secured to the first and second hoisting lines.

These and other objects and advantages of the present invention will become apparent from the following detailed description when taken in conjunction with the appended drawings wherein:

FIGURE 1 is a perspective view of a first form of cargo handling apparatus embodying the present invention;

FIGURE 2 is a broken vertical sectional view taken in enlarged scale along line 2—2 of FIGURE 1;

FIGURE 3 is a fragmentary bottom view taken along line 3—3 of FIGURE 2;

FIGURE 4 is a vertical sectional view taken on line 4—4 of FIGURE 2;

FIGURE 5 is a broken vertical sectional view taken in enlarged scale along line 5—5 of FIGURE 1;

FIGURE 6 is a perspective view showing a second form of cargo handling apparatus embodying the present invention;

FIGURE 7 is a broketn vertical sectional view taken along line 7—7 of FIGURE 6;

FIGURE 8 is a diametric view showing the mode of apparatus embodying the present invention; and FIGURE 9 is a fragmentary vertical sectional view taken in enlarged scale along line 9—9 of FIGURE 7.

Referring to the drawings, a first form of cargo handling apparatus A–1 embodying the present invention is shown in FIGURES 1 through 5. This form of apparatus includes a flat, horizontal pallet 10 provided with bale means taking the form of four upstanding posts 12 bridged by an apertured horizontal top plate 14. Four apertured girder members 16 extend diagonally inwardly from the posts 12 toward the center of the top plate 14 to define with the latter, an inverted truss. The inner ends of the girder members 16 are rigidly affixed to a vertical sleeve 18 as by welding. An annular support disc 20 is mounted at the center of the top plate and is rigidly connected to the inner ends of the girders by welding coaxial with the upper end of the vertical sleeve 18. Disc 20 is also welded to sleeve 18.

As indicated particularly in FIGURE 2, sleeve 18 rotatably carries a cylindrical lifting post 22 formed at its lower end with a boss 24. The upper end of lifting post 22 is bifurcated and a horizontal pivot pin 26 extends between the bifurcations 27 and 28. The lower end of the lifting post 22 is rigidly affixed as by welding to an annular indexing disc 29 formed with a plurality of circumferentially-spaced slots 30 around its periphery. A complementary indexing disc 32 is rigidly affixed by welding to the lower end of sleeve 18 coaxial with and immediately above disc 29. Fixed indexing disc 32 is formed with a plurality of circumferentially-spaced bores 34 around its periphery, such bores being equal in number and angular displacement to the slots 30 of indexing disc 28. Slots 30 and bores 34 selectively receive an indexing pin 36 to thereby lock indexing discs 29 and 32 against relative rotation. In this manner it is possible to adjust the angular position of the lifting post 22 relative to bale means 12 and hence pallet 10. Indexing pin 36 is moved vertically between an upper unlocked position and a lower locking position by means of a lever 37 pivoted to the upper end of a post 38 secured to top plate 14. Tension spring 39 biases the inner end of lever 37 and hence indexing pin 36 downwardly.

The pivot pin 26 connects the upper end of lifting post 22 to a generally triangular swivel yoke 40. The lower end of the swivel yoke 40 is formed with a bore 42 for receiving pivot pin 26. Swivel yoke 40 is interposed between the bifurcations 27 and 28 of lifting post 22. The upper side portions of swivel yoke 40 are formed with bored ears 44 and 46.

First and second swivels 52 and 54 of conventional construction are pivotally secured to yoke ears 44 and 46 by pins 56 and 58, respectively, as indicated particularly in FIGURE 2. The swivels 52 and 54 are in turn connected to the first and second hoisting lines 60 and 62 of the conventional derrick system of a ship.

Referring now to the remaining figures of the drawing, there is shown a second form of apparatus A–2 embodying the present invention. This second form of apparatus utilizes a flat, horizontal pallet 70 provided at one side with bale means taking the form of an upstanding side arm 72 from the upper end of which extends an inwardly-directed cross arm 74. The side arm 72 and cross arm 74 are of integral rigid construction. The side arm 74 extends to approximately the midportion of the pallet 70. A sideboard 75 is fixed to the inner surface of side arm 72. This second form of apparatus permits loading and unloading from three sides.

The free end of the side arm 74 is provided with a rigid horizontal channel member 76. The center of this channel member 76 is provided with indexing means similar to those described hereinbefore in conjunction with the first form of apparatus A-1. The indexing means includes a vertical sleeve 77 rigidly secured to the midportion of channel member 76. Within sleeve 77 is journaled a lifting post 78, as shown in FIGURE 9. The lower end of the lifting post 78 is rigidly affixed by welding to an annular indexing disc 79 similar to aforedescribed disc 29. A complementary fixed indexing disc 80 is defined by the midportion of channel 76 coaxial with disc 79 and sleeve 77. The indexing discs 79 and 80 are provided with peripherally-spaced alignable slots 82 and bores 84, respectively, adapted to selectively receive an indexing pin 36 identical to that described hereinbefore. Preferably, indexing pin 36 is operated by means of a lever 37 identical to that described hereinbefore.

The upper end of the lifting post 78 is bifurcated to receive a swivel yoke 90 similar to swivel yoke 40 described hereinbefore. Swivel yoke 90 is pivotally connected to the bifurcated upper end of the lifting post 78 by a horizontal pivot pin 84. The upper corners of the swivel yoke 90 are pivotally connected to a pair of conventional swivels 52 and 54, respectively, by pivot pins 91 and 92, respectively. The upper end of the swivels 52 and 54 are attached to first and second hoisting lines 60 and 62. Swivels 52 and 54 are identical to those described hereinbefore.

The operation of both forms of the aforedescribed apparatus A-1 and A-2 is substantially identical. Thus, referring to FIGURE 8, the apparatus is utilized to load and unload cargo from a ship S to a dock D. The ship S is provided with a pair of upstanding derrick posts 100 and 102. The lower portion of the derrick posts are pivotally connected to first and second booms 104 and 106. The free ends of the booms carry pulleys 108 and 110. The hoisting lines 60 and 62 extend upwardly from conventional winches 112 and 114 through the aforementioned pulleys 108 and 110 and then to the aforedescribed swivels 52 and 54.

The ship's hold is provided with a plurality of vertically-spaced decks 120, 122, and 124, the midportion of each deck being provided with removable panels 126. The removable panels 126 are lifted from their respective openings to provide access to the space below the decks. The upper deck 128 of the ship is provided with a hatch opening 130 through which cargo is loaded and unloaded.

In FIGURE 8, there is shown in solid outline apparatus A-2 embodying the present invention loaded with cargo 132 to be removed from deck 120. It should be understood that such cargo was loaded onto the pallet of apparatus A-2 by means of a fork lift truck 134, such fork lift truck being employed to transfer the cargo from the portions of the deck 120 to one side of the removable panels 126 to the apparatus A-2. With the cargo 132 in place on the apparatus A-2, the hoisting lines 60 and 62 are winched-in so as to raise the apparatus A-2 upwardly through the hatch opening 130 to the dotted line position designated 2 in FIGURE 8. Thereafter, the boom 104 is swung from its solid to its dotted outline position of this figure, lifting line 60 being tightened while lifting line 62 is loosened. This serves to swing the apparatus A-2 to a position (3) over the dock D. Apparatus A-2 is then lowered onto the dock D where the cargo can be received by a fork lift truck 136 on the dock.

It is important to note that the pallet 70 of the apparatus A-2 should be aligned with the fork lifts 134 and 136 as the apparatus A-2 touches down on the ship's deck 20 and the dock D, respectively. This alignment is obtained by inserting the indexing pin 36 within the proper slot 82 and bore 84 of the aforedescribed indexing discs 79 and 80. It should also be noted that the provision of the pivoting swivel yokes 40 and 90, respectively, of the two forms of apparatus A-1 and A-2 insures that all twists will be automatically removed from the hoisting lines 60 and 62. In this regard, attention is directed to FIGURE 9 wherein the parts of the supporting portion of the apparatus A-2 are shown as they appear when such apparatus is located in the position (3) of FIGURE 8. At this time, the swivel yoke 90 will have pivoted clockwise to its position of FIGURE 9 so as to permit the swivel 52 to extend generally vertically in the direction of its lifting line 60 with all of the weight of apparatus A-2 and its cargo being supported by the lifting line 60. Because of the provision of the swivel 52, any twist in the hoisting line 60 will be automatically removed and therefore not transferred to the apparatus A-2 so as to tend to rotate such apparatus out of its desired alignment. With continued reference to FIGURE 9, the angle X between the opposite sides of swivel yoke 90 should be less than 90 degrees so as to permit the pivot pins 91 and 92 to be aligned vertically with the pivot pin 84 as either line 60 or 62 takes the load of the apparatus. If such alignment is not provided, the bale means and hence pallet 70 would be tilted when all of the load is being supported by one or the other of the hoisting lines 60 and 62. The same is true with respect to swivel yoke 40.

It should further be noted that the inverted truss arrangement of both apparatus A-1 and A-2 permits the use of a low pickup point. Accordingly, where the upper deck 128 of the ship S supports a deck load (not shown), it is not necessary to raise the apparatus A-1 or A-2 to an excessive height and thereby apply excessive strain to the ship hoisting mechanism.

The girder members 16 and cross arm 74 are preferably rounded or curved as indicated in the drawings to minimize any tendency of these members to catch on the hatch openings of the ship S.

Various modifications and changes may be made with respect to the foregoing detailed description without departing from the spirit of the present invention or the scope of the following claims.

I claim:
1. Cargo handling apparatus for use with first and second hoisting lines for loading and unloading a ship, comprising:
   a pallet;
   bale means on said pallet;
   a lifting post carried by said bale means for rotation about a vertical axis relative to said bale means;
   an indexing disc keyed to said lifting post, said disc having circumferentially-spaced openings;
   a complementary fixed indexing disc on said bale means formed with circumferentially-spaced openings alignable with the openings of the indexing disc of said lifting post;
   an indexing pin selectively engageable with the openings of said indexing discs to adjust the angular position of said lifting post relative to said bale means; and
   a yoke connected to said lifting post.

2. Apparatus as set forth in claim 1 wherein said bale means includes upstanding side means rigidly affixed to a horizontal truss member that supports said lifting post and said fixed indexing disc.

3. Apparauts as set forth in claim 1 wherein said yoke is connected to said lifting post by a horizontal pivot pin.

4. Apparatus as set forth in claim 2 wherein said truss member is of the inverted type.

5. Apparatus as set forth in claim 3 wherein said yoke is generally triangular with the angle between the opposite sides of said yoke being less than 90 degrees.

6. Cargo handling apparatus for use with first and second hoisting lines for loading and unloading a ship, comprising:
a pallet;
bale means on said pallet;
a lifting post carried by said bale means for rotation about a vertical axis relative to said bale means;
an indexing disc keyed to said lifting post, said disc having circumferentially-spaced openings;
a complementary fixed indexing disc on said bale means formed with circumferentially-spaced openings alignable with the openings of the indexing disc of said lifting post;
an indexing pin selectively engageable with the openings of said indexing disc to adjust the angular position of said indexing pin relative to said bale means;
a swivel yoke pivotally connected to said lifting post; and
first and second swivel members affixed to said yoke, said swivel members being respectively secured to said first and second hoisting lines.

7. Apparatus as set forth in claim 6 wherein said bale means includes upstanding side means rigidly affixed to a horizontal truss member that supports said lifting post and said fixed indexing disc.

8. Apparatus as set forth in claim 6 wherein said swivel yoke is connected to said lifting post by a horizontal pivot pin and wherein said yoke is generally triangular with the angle between the opposite sides of said yoke being less than 90 degrees.

9. Apparatus as set forth in claim 7 wherein said truss member is of the inverted type.

10. Apparatus as set forth in claim 8 wherein said truss member is of the inverted type.

References Cited

UNITED STATES PATENTS

| 1,524,505 | 1/1925 | Blue | 214—16.1 |
| 1,783,021 | 11/1930 | Leach | 294—67 X |
| 2,020,174 | 11/1935 | Derossi | 294—81 X |

FOREIGN PATENTS

| 89,385 | 6/1937 | Sweden. |

GERALD M. FORLENZA, *Primary Examiner.*

F. E. WERNER, *Assistant Examiner.*